United States Patent [19]

Bryan et al.

[11] Patent Number: 4,525,914

[45] Date of Patent: Jul. 2, 1985

[54] METHOD AND APPARATUS FOR REPLACING BEARINGS

[75] Inventors: Larry E. Bryan, Sumner; Richard W. Grove, Bridgeport, both of Ill.; William F. Primus, Vincennes, Ind.

[73] Assignee: Marathon Oil Company, Findlay, Ohio

[21] Appl. No.: 491,513

[22] Filed: May 4, 1983

[51] Int. Cl.³ .................................. B23P 7/00

[52] U.S. Cl. .................................. 29/402.08; 417/223; 417/360

[58] Field of Search .................. 417/360, 361, 223; 29/402.08

[56] References Cited

U.S. PATENT DOCUMENTS 2,358,528 9/1944 Mott .................................. 417/360

3,771,915 11/1973 Back .................................. 417/360

*Primary Examiner*—Mark Rosenbaum

*Assistant Examiner*—V. K. Rising

*Attorney, Agent, or Firm*—Jack L. Hummel; Rodney F. Brown

[57] ABSTRACT

A method and apparatus are provided for replacing the bearing between the sampson post and the walking beam of an oil well pump. The walking beam and the pitman arms are securely fastened together to prevent relative movement therebetween. The head portion is adjustably restrained against the force of the counterweight. The walking beam is allowed to pivot on the connection between the walking beam and the pitman arms so that the walking beam moves away from the sampson post so that the bearing may be replaced.

2 Claims, 3 Drawing Figures

FIG. 1.
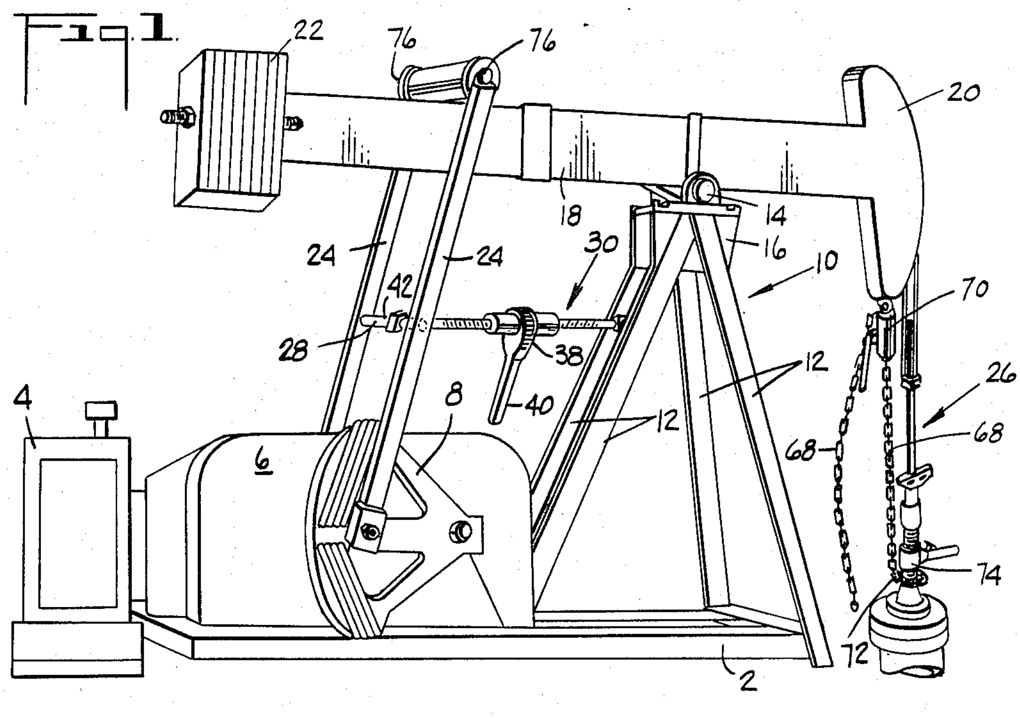
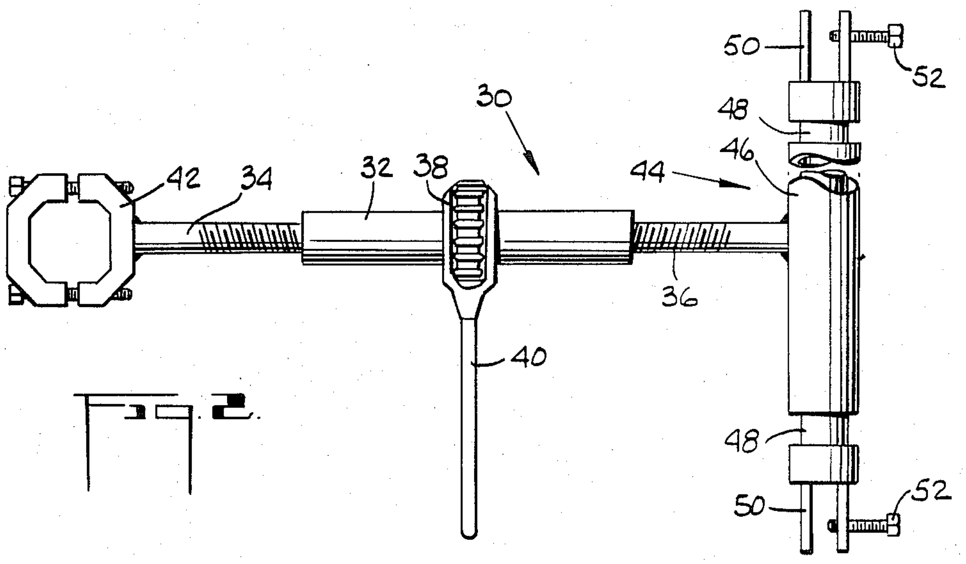
FIG. 2.
FIG. 3.
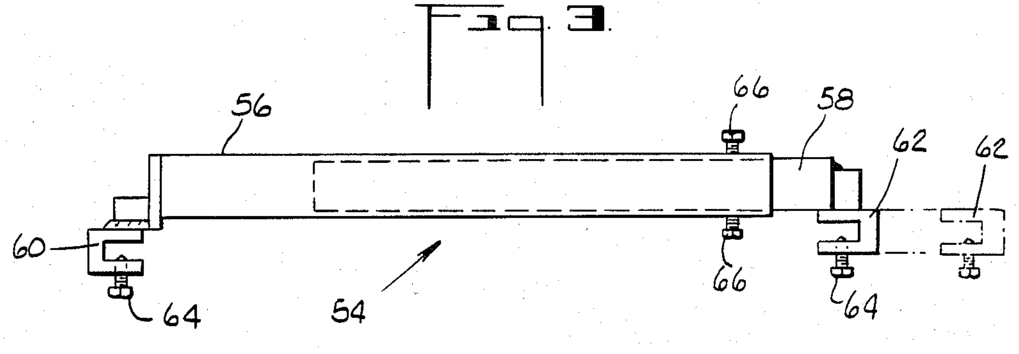

METHOD AND APPARATUS FOR REPLACING BEARINGS

FIELD OF THE INVENTION

This invention relates to the field of oil well pumps and is particularly directed to method and apparatus for replacing the bearing between the walking beam and the sampson post in most conventional oil well pumps.

BACKGROUND OF THE INVENTION

Conventional oil well pumps have a sampson post which is located in a fixed position on a frame and supports the main bearing on which the walking beam pivots. The normal continuous operation of the oil well pump places a severe strain on the main bearing and it must be replaced on a regular basis. Since these oil well pumps are located all over the oil field in relatively inaccessible areas, it is desirable that the replacement of the main bearing be accomplished with as little equipment as possible. A known method involves the use of chains and a boomer. However, this method allows for some play between the units and because of the heavy weights involved has some safety drawbacks.

BRIEF DESCRIPTION OF THE INVENTION

This invention is directed to method and apparatus for use in replacing the bearing between the sampson post and the walking beam in a conventional oil well pump. The sampson post and the pitman arms are securely fastened together to prevent relative movement therebetween. In the preferred embodiment, a turnbuckle having means for adjusting the same is used to provide the secured fastening. After the turnbuckle has been secured, the horse head on one end of the walking beam is adjustably fastened in a predetermined location. The bolts holding the bearing on the sampson post are loosened. The adjustable fastening of the horse head is gradually loosened to allow the counterweight to pivot the walking beam around the normal pivot between the walking beam and the pitman arms. This movement separates the walking beam away from the sampson post so that the old bearing may be removed and a new bearing placed in position. The adjustable fastening means of the horse head are operated to bring the walking beam back into position on the sampson post and the connection of the bearing to the walking beam and the sampson post is completed.

It is an object of this invention to provide a safe method and apparatus for use in replacing the bearing between the sampson post and the walking beam in an oil well pump.

It is another object of this invention to provide a method and apparatus for use in replacing the bearing between the sampson post and the walking beam in an oil well pump wherein the sampson post and the pitman arms are securely fastened together to prevent relative movement therebetween.

The foregoing and other objects, features, and advantages of the invention will be apparent from the following more particular description of preferred embodiments as illustrated in the accompanying drawings in which like reference characters refer to the same parts throughout the various views. The drawings are not necessarily to scale, emphasis instead being placed upon illustrating the principles of the invention.

BRIEF DESCRIPTION OF THE DRAWINGS

FIG. 1 is a pictorial view of the principle parts of an oil well pump equipped in accordance with this invention;

FIG. 2 is a top plan of one securing means of this invention; and

FIG. 3 is a side elevation of an attachment to be used with the securing means of this invention.

DETAILED DESCRIPTION OF THE INVENTION

In FIG. 1, there is illustrated an oil well pump comprising a frame 2 adapted to be positioned on the ground. A motor 4 is adjacent one end of the frame and is connected to gear means in a box 6 for rotating a crankarm 8.

A sampson post 10 comprising a plurality of legs 12 is mounted on the other end of the frame 2. A bearing 14 is mounted on a unit 16 supported by the legs 12. Mounted on the bearing 14 for pivotal motion is a walking beam 18 which has a conventional horse head 20 at one end and a counterweight 22 at the other end. A pair of pitman arms 24 are rotatably attached to the crankarms 8 at one end and to the walking beam 18 at their other ends. Extending from the horse head 20 are conventional means 26 for raising and lowering the pipe stand. In the oil well pump of FIG. 1, the pitman arms 24 are held in spaced apart relationship by a rod 28 attached thereto.

In FIG. 2, there is illustrated a turnbuckle 30 comprising a casing 32 and threaded rods 34 and 36. A ratchet 38 and handle 40 are provided for moving the rods 34 and 36 into and out of the casing. At the free end of the rod 34, there is secured a clamp 42, such as by welding, that is adapted to be secured to the rod 28 holding the pitman arms 24 in the spaced apart relationship. A member 44 is secured, such as by welding, to the free end of the rod 36. The member 44 has a body portion 46 and extending from each side of the body portion is a rod 48 having a bifurcated member 50 at each end. Securing means 52 are provided so that the member 44 may be placed between two of the legs 12 with portions of the legs in the bifurcated members and be secured in place.

In some instances, the pitman arms do not have a connecting rod 28. In FIG. 3, there is illustrated means 54 for providing a connecting rod between the pitman arms 24. The means 54 comprises a hollow body 56 having a rod 58 slidably mounted therein. At the free end of the body 56 there is a bifurcated member 60 and at the free end of the rod 58 there is a bifurcated member 62. The rod 58 is extended outwardly and then closed so that a portion of each pitman arm 24 is in the bifurcated members 60 and 62. Means 64 are provided to hold the bifurcated members 60 and 62 in position and means 66 are provided to hold the body 56 and rod 58 in assembled relationship. After the means 64 have been attached to the pitman arms 24, the clamp 42 can be positioned around the body 56.

A chain 68 and a ratchet type load binder 70 are provided to hold the horse head 20 in a desired position. As illustrated in FIG. 1, one end 72 of the chain 68 is secured to an object 74 capable of overcoming a force exerted by the counterweight 22. The chain 68 is passed through the ratchet type load binder 70 which is secured to the horse head 20. Operation of the ratchet type load binder 70 changes the distance between the horse head 20 and the object 74.

In operation, the turnbuckle 30 is attached to the legs 12 of the sampson post 10 and the connecting rod 28 of the pitman arms 24. The ratchet 38 is moved by the handle to securely hold the sampson post 10 and the pitman arms 24 in a predetermined spaced relationship. In this arrangement, there is a tendency for the walking beam 18 to pivot around the bearings 76 connecting the walking beam 18 to the pitman arms 24. Since the counterweight applies the greater moment of force on the walking beam, if no restraining force were applied, the counterweight 22 would move downwardly. As illustrated in FIG. 1, the chain 68 provides the restraining force. The connections holding the bearing 14 to the sampson post 10 and the walking beam 18 are loosened. The ratchet type load binder 70 is operated to allow the horse head to move upwardly due to the walking beam 18 being pivoted through the bearings 76 connecting the walking beam 18 to the pitman arms 24 by the action of the counterweight 22. As this movement continues, the walking beam 18 moves upwardly away from the sampson post 10 so that the old bearing 14 may be removed and the new bearing 14 can be installed. The ratchet type load binder 70 is then operated to pull the horse head 20 downwardly so that the walking beam 18 moves downwardly so that the connections between the bearing 14, the sampson post 10 and the walking beam 18 can be completed. The chain 68 and the turnbuckle 30 are removed and normal operation of the oil well pump can be resumed.

While the preferred embodiments of the invention have been illustrated and described herein, it may be otherwise embodied and practiced within the scope of the following claims.

What is claimed is:

1. A method for replacing the bearing between the sampson post and the walking beam of an oil well pump having a head portion secured to one end of the walking beam, a counterweight on the other end of the walking beam and pitman arms for operating the walking beam comprising:

securely fastening the sampson post and the pitman arms together to prevent relative movement between the sampson post and pitman arms;

adjustably securing the head portion at a predetermined position;

loosening the connection of the bearing between the sampson post and the walking beam; and adjusting said adjustable head portion securing means so that the counterweight will pivot said walking beam away from said sampson post an amount sufficient to allow said loosened bearing to be removed and a new bearing installed.

2. A method as defined in claim 1 and further comprising:

providing adjusting means for said fastening of the sampson post and pitman arms.

* * * * *